(12) United States Patent
Nocentini et al.

(10) Patent No.: US 7,408,268 B1
(45) Date of Patent: Aug. 5, 2008

(54) ANTI-ISLANDING METHOD AND SYSTEM FOR DISTRIBUTED POWER GENERATION SYSTEMS

(75) Inventors: Danio Nocentini, Florence (IT); Sauro Macerini, Arezzo (IT)

(73) Assignee: Magnetek, S.p.A., Arezzo (IT)

( * ) Notice: Subject to any disclaimer, the term of this patent is extended or adjusted under 35 U.S.C. 154(b) by 473 days.

(21) Appl. No.: 11/197,128

(22) Filed: Aug. 4, 2005

(51) Int. Cl.
*H02J 1/00* (2006.01)
(52) U.S. Cl. ........................................... 307/16
(58) Field of Classification Search .................... 307/16
See application file for complete search history.

(56) References Cited

U.S. PATENT DOCUMENTS

| | | | | |
|---|---|---|---|---|
| 4,878,208 | A | 10/1989 | Seki et al. ..................... 307/87 |
| 5,162,964 | A | 11/1992 | Higasa et al. .................. 361/20 |
| 5,493,485 | A | 2/1996 | Okado ........................ 363/56 |
| 5,677,833 | A | 10/1997 | Bingley ....................... 363/71 |
| 5,686,766 | A | 11/1997 | Tamechika ................... 307/43 |
| 6,172,889 | B1 | 1/2001 | Eguchi et al. ................. 363/95 |
| 6,219,623 | B1 | 4/2001 | Wills .......................... 702/60 |
| 6,429,546 | B1 | 8/2002 | Ropp et al. ................... 307/31 |
| 6,452,289 | B1 | 9/2002 | Lansberry et al. ............. 307/25 |
| 6,761,581 | B2 | 7/2004 | Takehara et al. ............. 439/502 |
| 6,801,442 | B2 | 10/2004 | Suzui et al. ................... 363/55 |
| 6,810,339 | B2 | 10/2004 | Wills .......................... 702/65 |
| 6,850,074 | B2 | 2/2005 | Adams et al. ................ 324/527 |
| 6,853,940 | B2 | 2/2005 | Tuladhar ..................... 702/111 |
| 6,879,919 | B2 | 4/2005 | Loewe et al. .................. 702/66 |

OTHER PUBLICATIONS

"Prevention of Islanding in Grid-connected Photovoltaic Systems", M.E. Ropp, M. Gegovic and A. Rohatgi.

*Primary Examiner*—Robert L. Deberadinis
(74) *Attorney, Agent, or Firm*—Waddey & Patterson; Mark J. Patterson

(57) ABSTRACT

An electrical power supply system connected to an electrical grid, includes at least one source of electrical power, an inverter which receives power from the electrical source and delivers power to a local load, and a connection to the electrical grid. The system also includes a control unit for controlling the inverter, which interrupts the delivery of power by the inverter when at least one electrical parameter of the system exceeds a threshold value. The system also includes anti-islanding logic which detects at least one symptom of an islanding condition of the system and, when the symptom is detected, to cause a variation in the power level delivered by the inverter.

21 Claims, 5 Drawing Sheets

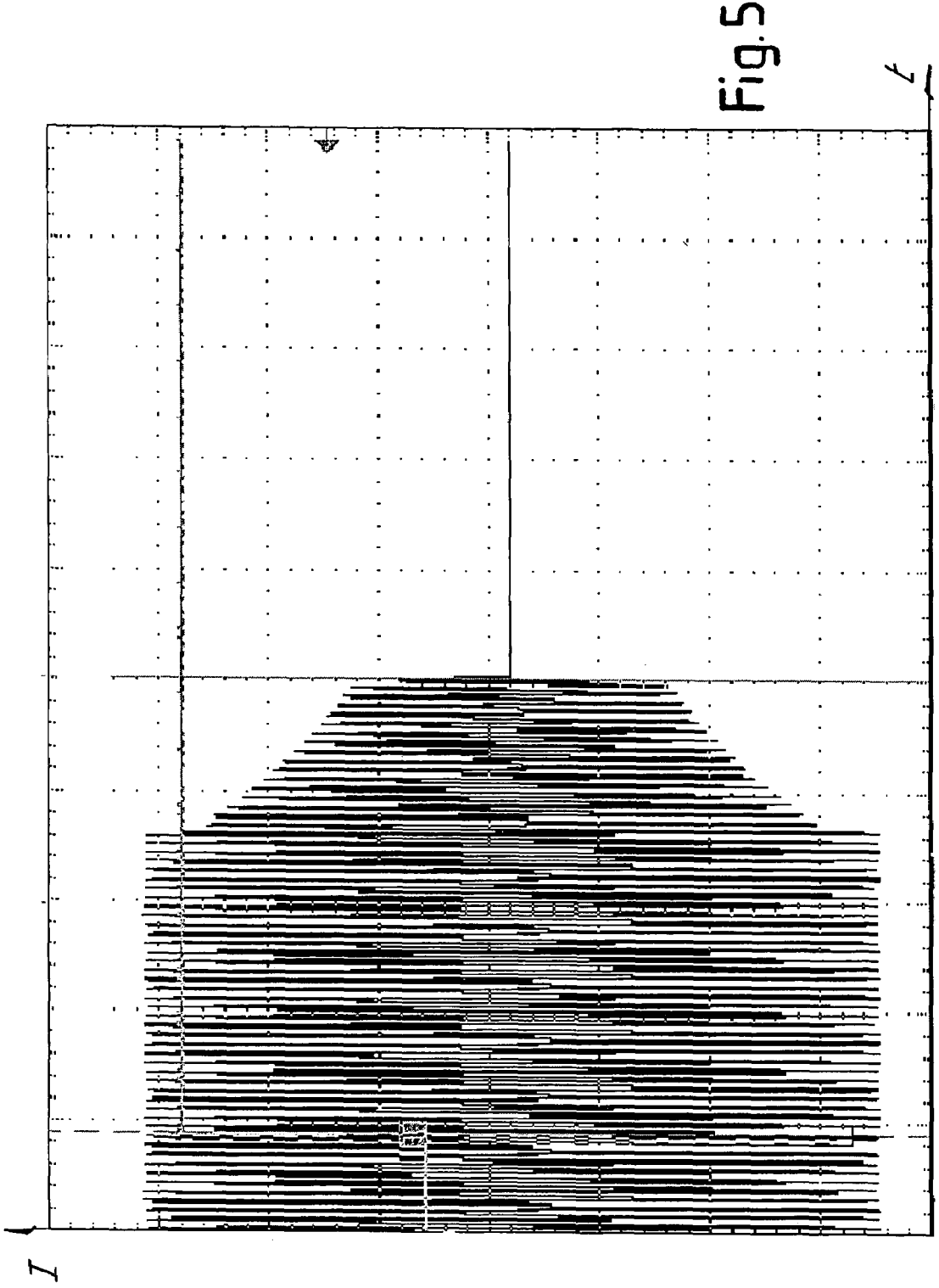

ANTI-ISLANDING METHOD AND SYSTEM FOR DISTRIBUTED POWER GENERATION SYSTEMS

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention generally concerns the distributed generation of electricity by means of alternative sources such as photovoltaic cells, fuel cells, wind generators and the like, or via conventional sources such as autogenous units with small internal combustion engines for the local generation of electricity. More particularly, this invention pertains to methods of automatically interrupting a distributed power generating source when the power source is electrically disconnected from the power grid.

To deal with the problem of environmental pollution and the increasing domestic demand for electricity, the installation of distributed electricity generator units to power moderately-sized loads is currently encouraged for residential and commercial buildings or in the industrial sector. These generator units use alternative energy such as solar energy, by means of photovoltaic cells, or wind energy by means of wind generators. Typically an alternative source of this type that generates a direct current is combined with a power conditioning unit that includes an inverter. The inverter is connected in parallel to the public power grid so that a generic local load can be powered alternatively by the grid, by the inverter, or by both. When the power supplied by the alternative source is insufficient to power the load, it is supplied wholly or partly by power taken from the grid. Conversely, when the load absorbs less power than that available from the alternative source, or when the load is not powered, the power generated by the alternative source is fed into the grid.

FIG. 1 shows schematically a system comprising an alternative source 1, such as a battery of photovoltaic cells, connected to an inverter 3. The inverter 3 is connected to a node A to which a generic local load 5 is connected, schematically shown as a parallel R, L, C load circuit. The inverter is connected in parallel to the grid, schematically shown by an AC voltage source 7 connected to a grid line 8 for distribution of the electricity. A transformer 9 and a switch 11 separate the source 7 from the line 8.

The generic switch 11 is opened to isolate a portion of the grid from the grid power source 7 if, for example, maintenance work has to be carried out on that portion (e.g., line 8) of the grid. The switch 11 can also open automatically in the case of a short circuit for example.

When the switch 11 is opened, the alternative source 1 via the inverter 3 can continue to power both the load 5 and the portion of grid downstream of the switch 11. A situation of this type is potentially very dangerous. For example, having opened the switch 11, maintenance personnel may wish to work on line 8 to repair a fault. If the inverter 3 is supplying power, this can lead to the risk of electrocution.

A further serious drawback that can occur if the grid is temporarily disconnected from the load 5 is that the inverter 3 loses its phase synchronism with the grid voltage. This synchronism is normally maintained by means of a phase-locked loop (PLL), which keeps the frequency and the phase of the output of inverter 3 synchronized with the frequency and phase of the grid voltage. When the grid voltage is removed, the inverter 3 can begin to power the load with a voltage having a phase which changes in a non-controlled way. When the switch 11 is re-closed, the grid and inverter output voltages are no longer in phase.

It is therefore necessary to provide means to de-activate the inverter 3 when an interruption occurs in the connection between node A and the grid line 8. For this purpose, the power control and conditioning unit normally includes an over-voltage relay, a low limit voltage relay, a high limit frequency relay and a low limit frequency relay. It is known, in fact, that in the majority of operating conditions of a system of this type, when the grid is disconnected from the load a rapid variation occurs in the inverter output frequency and/or voltage. Therefore, in a very short time, in the order of tenths of a second, the output voltage or frequency of the inverter 3 can be sensed to activate one of the four protection relays, causing the inverter to switch off.

For a detailed discussion of how the four relays cut in, see U.S. Pat. No. 6,429,546, and also M. E. Ropp et al., *Prevention of Islanding Grid-connected Photovoltaic Systems*, in *Progress in Photovoltaics: Research and Applications*, 7, 1999, pages 39-59.

A situation exists, however, in which the four protection relays are not able to interrupt operation of the inverter. This occurs when, at the time the switch 11 opens, the load 5 is not absorbing power from the grid and its power factor is equal to 1. When this happens, opening of the switch 11, i.e. electrical separation of node A from the grid power source 7, does not cause any variation in the output frequency or voltage of the inverter 3. Accordingly, the inverter is not switched off. This condition is called islanding. Islanding is a safety hazard because the portion of the grid electrical line 8 that is connected to the inverter 3 remains powered.

In practice, islanding is not limited to situations when the power supplied by the grid to the local load has a zero value. On the contrary, the four protection relays described above will not operate under circumstances where the reactive power and active power absorbed by the grid are equal to zero.

Various systems have been studied to avoid this phenomenon of islanding, based on active methods or passive methods. An overview of the various methods currently used can be found in the article referred to by M. R. Ropp et al.

Further methods and devices to prevent the phenomenon of islanding are described in the following U.S. Pat. Nos. 6,801,442; 6,853,940; 6,429,546; 6,219,623; 6,172,889; 5,686,766; 5,493,485; 5,162,964; 4,878,208. The contents of these and other documents and patents referred to are entirely incorporated in the present description.

All of these methods are based on the idea of identifying an electrical parameter indicating a condition of islanding, or if necessary, actively inducing a variation in the inverter output. In general they are defined as active methods or passive methods of identifying the conditions of islanding according to whether a forced variation of the inverter output is induced or not. A typical active method for identifying the condition of islanding is based on impedance measurement. This method is based on the fact that by varying via a disturbance one of the three parameters of the current delivered by the inverter 3 (phase, magnitude or frequency), the variation will cause a consequent voltage variation at node A if the electrical grid (7, 8) is disconnected, i.e. if the system is in an islanding condition. If not, the disturbance is "absorbed" by the grid.

Whatever the method used to identify an islanding condition, the methods known in the prior art provide for de-activation of the inverter when the device detects a situation that is interpreted as a symptom of an islanding condition. Therefore, if in practice the system is not isolated, but the device has detected a false islanding condition, the inverter is inappropriately de-activated, with consequent unnecessary inconvenience for the user and loss of power generated by the alternative source.

BRIEF SUMMARY OF THE INVENTION

One object of the present invention is to provide a method and a system that improves the known methods and devices for the prevention of islanding. Generally, the invention is based on the concept of detecting an islanding condition according to any one of the conventional methods available. However, instead of causing an immediate de-activation of the inverter in response to detection of an islanding parameter, the present invention causes a variation in the power level delivered by the inverter towards the load and towards the grid. This temporary variation in inverter power level will have no effect if the system is in a normal operating condition, with the grid active. On the other hand, if the system is actually and effectively in an islanding condition, i.e., if the grid voltage source is no longer applied to the local load powered by the inverter, the reduction in the power level delivered by the inverter will cause a rapid variation in at least one of the electrical parameters of the system which is normally used to de-activate the inverter.

For example, as described previously, the inverter control device can have a series of over-voltage, minimum voltage, and maximum and minimum frequency protection relays. The temporary variation in power delivered by the inverter when the system is effectively in an islanding condition will cause an increase or a reduction in the inverter output voltage and in powering of the load and/or a reduction or an increase in the power supply frequency, according to the type of power (active or reactive) instantaneously absorbed by the load. Whatever the type (voltage or frequency) and sign (increase or reduction) of the parameter change induced by the variation in power delivered, it will result in cut-off of the inverter by means of one or other of the protection relays or interruption of delivery of power by the inverter towards the load and towards the grid. The cut-in time is very short and comparable to that of the traditional systems.

On the contrary, if the system is not in an effective islanding condition and therefore if the condition detected is a false alarm, the temporary power variation will not cause any variation either in the power supply frequency or voltage of the local load, since it will be compensated for by the electrical grid. In this situation the inverter remains active and, after a pre-set interval during which the power delivered by the inverter is kept at the varied level with respect to the nominal level, the original delivery condition will be restored to the power level prior to the variation induced by detection of the (false) islanding condition.

The advantages of this operating method are clear. Cut-off of the power supply system (the renewable source and the inverter) is avoided as is the need to restore the system in the event of false detection of an islanding condition. Reset operations are reduced and exploitation of the energy generated by the renewable source is maximized.

The method of the present invention can be applied particularly advantageously in the case of renewable energy sources, and in particular in the case of photovoltaic cells. However, its application is general and it can be advantageously used whenever an alternative electrical power source has to be positioned parallel to the electricity supply grid to power a local load and to feed the excess power into the grid. For example, the system can be used also with diesel engine or turbine generator units employed to power a load in parallel with the electricity distribution grid.

In one embodiment, the invention concerns a method to control a power supply system connected to a grid, the power supply system including an electrical power source and an inverter connecting the electrical power source to the grid and to a local load, comprising the following steps: (a) deliver power from the source via the inverter; (b) detect a characteristic indicating a condition of islanding of the system; (c) when the characteristic is detected, impose a temporary variation on the power level delivered via the inverter, (d) monitoring the power source while there is a temporary variation in power level to detect a characteristic indicating a condition of islanding of the system; and (e) the inverter is de-activated, i.e. the delivery of power is interrupted, following variation in the power level if the system is in an effective islanding condition, while it remains active if the system is not in an effective islanding condition.

According to a particular aspect of the present invention, a method is provided to control a power supply system connected to a grid, the power supply system including an electrical power source, an inverter connecting the electrical power source to the grid and a load connected to the inverter, comprising the following steps: (a) deliver power to the load; (b) determine a symptomatic condition of an islanding situation of the system; (c) temporarily modify the power delivered to the load; and (d) if the symptomatic condition of an islanding situation corresponds to an effective islanding condition of the system, the inverter switches off or the delivery is interrupted as a result of modification of the power delivered to the load, while if the symptomatic islanding condition does not correspond to an effective islanding condition, the inverter remains on.

According to a further aspect of the present invention, a method is provided for controlling a power supply system connected to a grid, the power supply system including an electrical power source, an inverter connecting the electrical power source to the grid and a load connected to the inverter, comprising the following steps: (a) deliver power to the load; (b) determine a symptomatic condition of an islanding situation of the system; (c) when a symptomatic condition of an islanding situation is determined, impose a variation in the power level delivered by the inverter to cause switch-off of the inverter, or interruption of the current delivery via the inverter towards the load, if the symptomatic condition of an islanding situation corresponds to an effective islanding condition.

In one embodiment, the invention concerns a method for controlling a power supply system connected to a grid, the power supply system having an electrical power source, an inverter connecting the electrical power source to the grid and a load connected to the inverter, comprising the following steps: (a) deliver power to the load; (b) determine a condition symptomatic of an islanding situation of the system; (c) when a condition symptomatic of an islanding situation is determined, impose a variation in the power level delivered by the inverter; and (d) if the variation in the power level delivered by the inverter causes a variation beyond a pre-set limit in an electrical parameter of the system, cause switch-off of the inverter, i.e. in general interruption of the current delivery towards the load and/or towards the grid.

As indicated previously, in principle the islanding condition of the system can be detected with any one of the conventional methods available. However, an advantageous embodiment of the invention provides for use of a so-called active system, for example a system based on detection of an impedance variation.

The power level delivered by the inverter can be modified either by increasing or reducing the power delivered via an increase or reduction in the inverter output current. However, according to a preferred embodiment of the invention, the variation imposed on the inverter output power is a reduction of the power itself. This permits safe operation, even if the islanding condition is detected at a time when the source connected to the inverter is delivering the maximum power available and therefore would not be able to cope with an increased variation in the power delivered by the inverter.

According to a different embodiment, the invention concerns an electrical power supply system connected to an electrical grid, comprising at least one electrical power source, an inverter that receives power from the electrical source and delivers power to a local load, a connection to the electrical grid; a device for controlling the inverter, which interrupts the delivery of power via the inverter when at least one electrical parameter of the system exceeds a threshold value, and an anti-islanding device, which detects at least one symptom of an islanding condition of the system and which, when the symptom is detected, causes a variation in the power level delivered by the inverter, which can indirectly cause complete interruption of the energy delivery if the system is in an effective islanding condition.

Further characteristics of the system and method according to the invention will be clearly illustrated in the following detailed description of an embodiment of the invention.

BRIEF DESCRIPTION OF THE SEVERAL VIEWS OF THE DRAWINGS

FIG. 5 shows the waveform of the current at the output of the inverter when an effective islanding condition of the system corresponds to the signal that causes reduction in the power delivered.

DETAILED DESCRIPTION OF THE INVENTION

Figure 1:
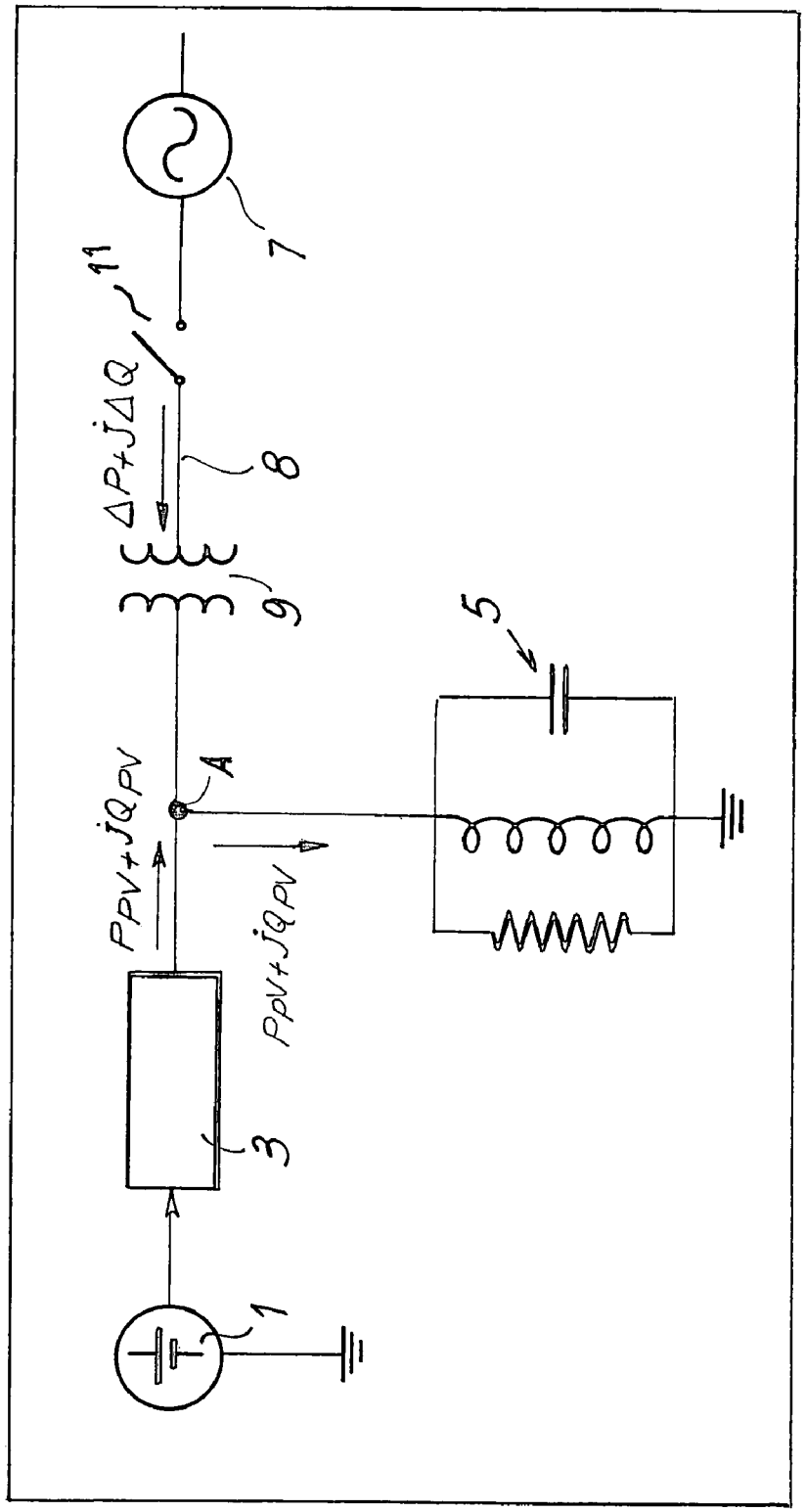
FIG. 1 is a simplified schematic and block diagram of a conventional power system comprising a renewable electrical energy source connected in parallel via an inverter to an electrical grid and to a load.
Figure 2:
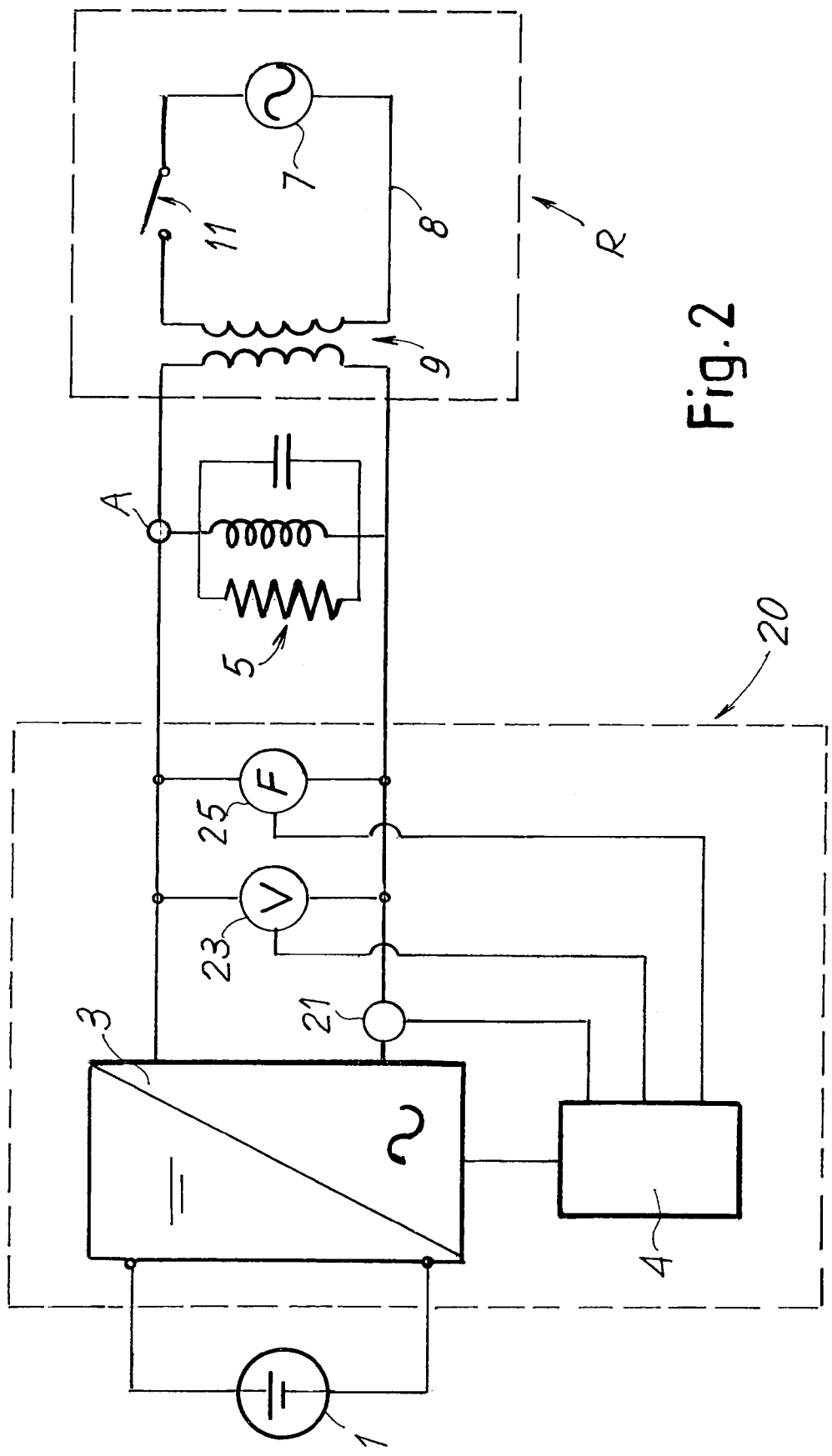
FIG. 2 is a schematic and block diagram of a power system that incorporates the anti-islanding the system of the present invention.

FIG. 2 is a block and schematic diagram of a power system that embodies the invention. The power system includes a power source 1, for example a battery of photovoltaic cells, which generates a direct current. This must be converted into alternating current to power a local load or to be fed into the electricity distribution grid. For this purpose the system further includes an inverter 3 controlled by a management and control device 4. A load 5 is connected to the output of the inverter 3, which is schematically represented as a load comprising a resistive component, a capacitive component and an inductive component. The connection point of the inverter 3 to the load is designated by the letter A. The inverter 3 is also connected in parallel to the electrical distribution grid, indicated overall by R and schematically represented by an alternating voltage source 7, by a distribution line 8, by a transformer 9, and by a switch 11 for disconnection of the alternating voltage source 7 from the grid R.

In a conventional manner, the power generated by the source 1 is supplied to the load 5 in the amount required by the load. Any excess power is delivered into the grid R and any power requirements by the load exceeding the power that can be supplied via the inverter 3 are supplied by the grid R.

The anti-islanding system is schematically indicated in block 20 and includes, in addition to the inverter 3 and the control unit 4, conventional auxiliary circuits which, in the diagram of FIG. 2, are a current sensor 21 which detects the current at the output of the inverter 3, a voltage sensor 23 which detects the output voltage from the inverter 3, i.e. the voltage across the load 5, and a frequency sensor 25 which determines the frequency of the output current of the inverter 3.

Using conventional sensing techniques, the sensors 21, 23 and 25 and the control unit 4 monitor and are able to detect a variation in the voltage or the frequency of the signal across the load 5, or the magnitude of current delivered by the inverter 3. By providing over-voltage, minimum voltage and maximum and minimum frequency switches or relays incorporated in the control device 4, it is possible to disable or cut off the inverter 3 whenever the switch 11 of the grid R is opened and therefore the system is isolated from the grid. This cut-off of the inverter 3 occurs in a conventional way and is described in the publications incorporated by reference to the present description. The control unit 4 includes interrupt logic that is functional to disable or cut off the inverter 3.

The switch 11 may open in a situation in which the unit 4 is not able to detect the condition of isolation, for example because the active and reactive power which the load 5 absorbs from the grid R is too low and the load 5 functions with a power factor equal to 1. In a conventional system for detection of this islanding condition, the control device 4 automatically causes cut-off of the inverter 3, interrupting the delivery of energy to the load 5 and towards the grid R. However, according to one aspect of the present invention, the anti-islanding hardware and logic incorporated in the control unit 4 operates in a different manner. If the sensors 21, 23, 25 in system 20 detect a potential islanding condition, i.e. a condition or a parameter symptomatic of a situation or condition of islanding, the power delivered via the inverter 3 to the load 5 is not immediately cut-off but is temporarily reduced by control unit 4. This temporary variation in the inverter power level occurs via a temporary reduction in the magnitude of the current at the output of the inverter 3. During the time period during which the inverter output level is temporarily varied, the inverter output is monitored by sensors 21, 23, and 25 and control unit 4. If the power system is in an effective islanding condition, this means that the grid R is completely disconnected from the system. Accordingly, because the grid R cannot compensate for the variation in power delivered by the inverter 3 to the load 5, a consequent variation in an electrical parameter of the system can be detected again by sensors 21, 23, or 25. Typically, this variation in parameter will be the voltage across the load 5 which can be detected by the sensor 23, or also a variation in the frequency of the output signal from the inverter 3 detectable by the sensor 25. Whatever the electrical parameter detected, its variation will cause, via the control unit 4 and in a conventional way, a cut-off of the inverter 3. For example a variation in frequency or voltage across the load will cause cut-in of one of the maximum or minimum frequency or over-voltage or minimum voltage relays respectively.

Using this novel method, a detection of a condition symptomatic of islanding does not cause immediate cut-off of the inverter 3. Rather, a variation in its operating parameters will result in switch-off of the inverter if and only if the power system is effectively in an islanding condition, while the inverter 3 will remain operating if the system is not isolated from the grid R.

The reduction in the power level delivered by the inverter 3 can be in the range of from 0.1% to 100% of the power level delivered at the moment when the occurrence of an islanding condition is identified, or a symptomatic condition of an islanding condition is detected. Normally a variation of between 5% and 20% is sufficient. However, these values are suggestive and non-limiting. The reduced power level is maintained for a suitable interval of time, for example 0.5-2 seconds if the inverter 3, during which time the inverters is not cut-off. These times are purely indicative and non-limiting. Once this pre-set time has elapsed without the inverter 3 being cut off by the relays or other devices known and contained in the control unit 4, the logic in the control unit restores the power level delivered by the inverter 3 to the value prior to the reduction caused by the false islanding condition signal. It follows that the inverter 3 is effectively de-activated, i.e. cut off, only when the system is in an effective islanding condition and not when the control device detects a false alarm.

Figure 3:
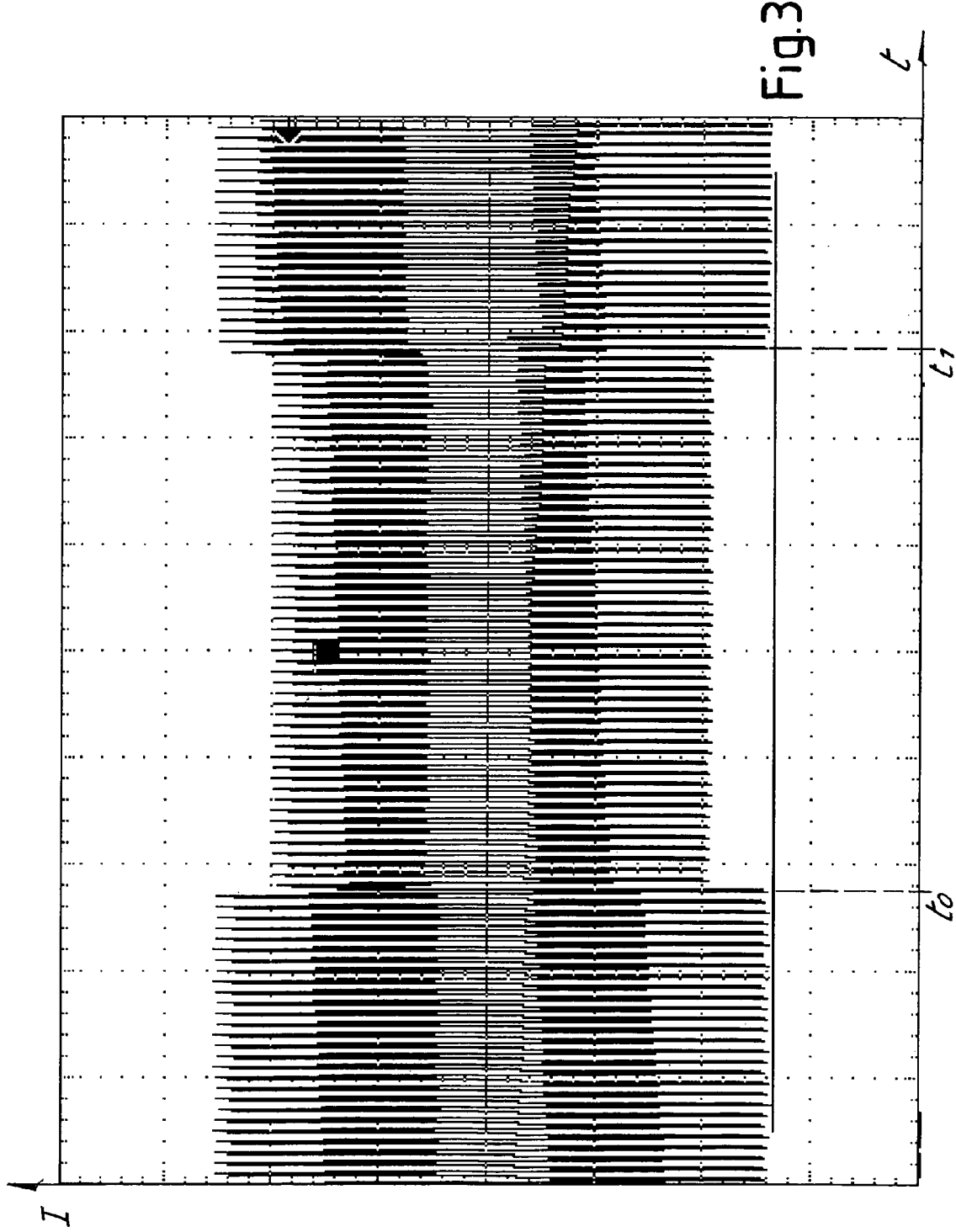
FIG. 3 shows a waveform of the current at the inverter output in the case of a false islanding condition signal.
Figure 4:
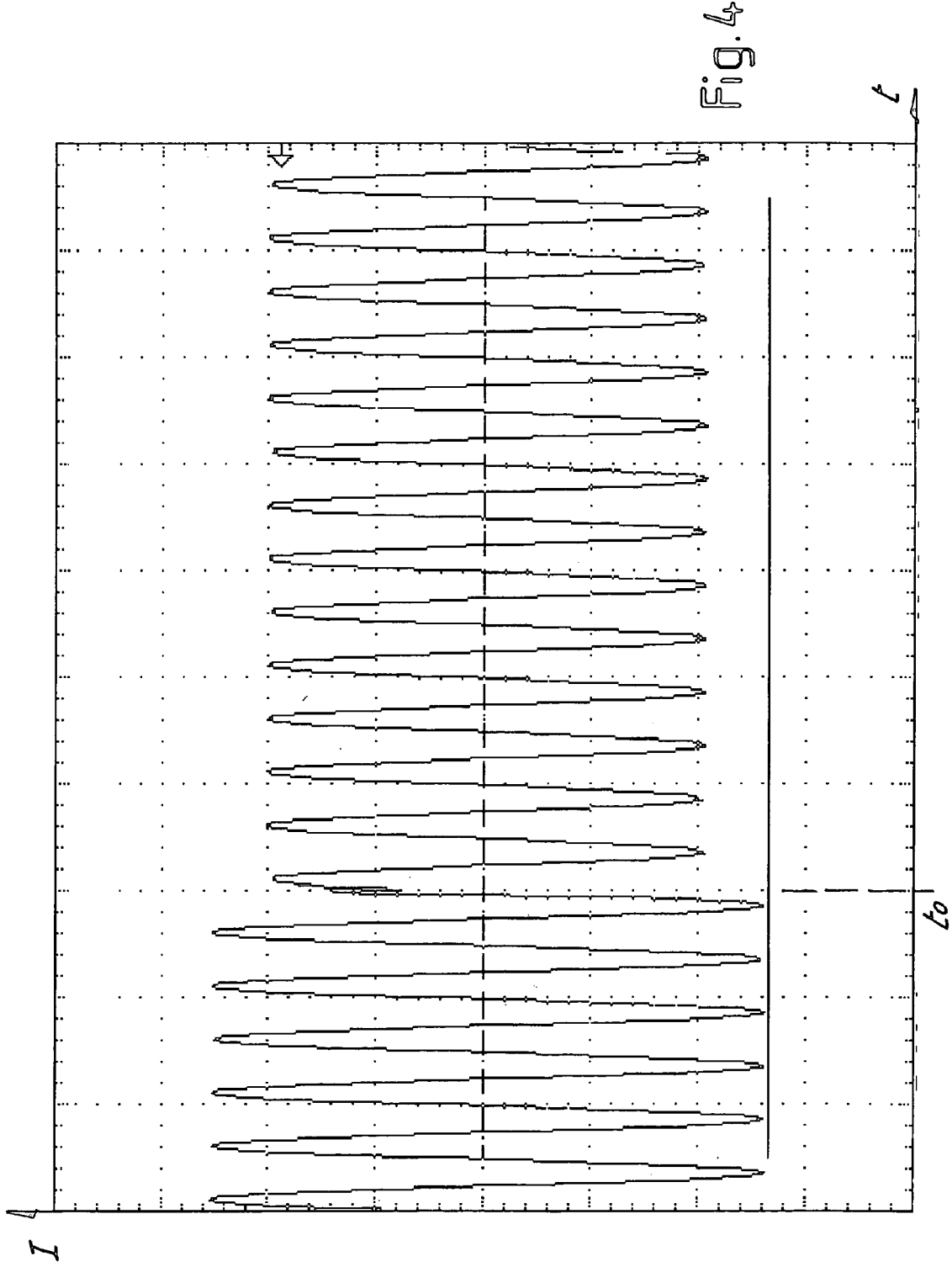
FIG. 4 shows a portion of the waveform of FIG. 3 with a different time scale.

FIGS. 3, 4 and 5 show the waveforms of the current at the inverter output in different operating conditions of the system according to the invention. FIG. 3 shows the current waveform in the case of a false islanding condition signal. At time $t_0$, a signal indicating a presumed islanding condition of the system causes reduction of the power delivered by the inverter 3 and therefore a reduction in the current I at the inverter output. After a time interval ($t_1$-$t_0$), for example in the order of one second, the inverter 3 has not switched off which indicates that the system is not effectively isolated from the electrical grid and therefore the signal indicating a presumed islanding condition was in reality a false alarm. At the instant $t_1$, the power delivered by the inverter 3 is restored to the value it had at time $t_0$. FIG. 4 shows a portion of the waveform of FIG. 3 with a different time scale.

FIG. 5 shows the waveform of the current I at the output of the inverter 3 when an effective islanding condition of the power system corresponds to the signal that causes reduction in the power delivered. In this case the reduction in the current I at the inverter output imposed by the control unit 4 causes switch-off of the inverter in a very short time, below the time interval ($t1$-$t0$).

In the described embodiment, the anti-islanding condition is effectively removed by interrupting the delivery of power from the power source by disabling the inverter. In other embodiments, the power source may include power circuits other than inverters and/or may be interrupted by disconnecting the power source from the load rather than disabling the power source.

It is understood that the drawing only shows an example provided solely as a practical demonstration of the invention, since the invention can vary in form and arrangement without however departing from the scope of the concept underlying the invention.

Thus, although there have been described particular embodiments of the present invention of a new and useful ANTI-ISLANDING METHOD AND SYSTEM FOR DISTRIBUTED POWER GENERATION SYSTEMS, it is not intended that such references be construed as limitations upon the scope of this invention except as set forth in the following claims.

What is claimed is:

1. A method for controlling a power supply system connected to a power grid, the power supply system including an electrical power source, the method comprising the steps of:
   a. delivering power from the power source;
   b. detecting a characteristic indicating an islanding condition of the power supply system;
   c. in response to detecting the characteristic indicating an islanding condition, causing a temporary variation in the power delivered by the power source;
   d. while the power delivered by the power source is temporarily varied, monitoring the power source for a characteristic indicating an islanding condition of the power supply system;
   e. if a characteristic indicating an islanding condition of the power supply system is detected while the power delivered by the power source is temporarily varied, interrupting the power source to remove the islanding condition; and
   f. if a characteristic indicating an islanding condition of the power supply system is not detected while the power delivered by the power source is temporarily varied, removing the temporary variation in the power delivered by the power source.

2. The method of claim 1, wherein when the power source includes an inverter and wherein when the characteristic is detected, power from the inverter is temporarily reduced.

3. The method of claim 2, wherein the power delivered by the power source is varied by modifying a magnitude of current delivered by the inverter.

4. The method of claim 2, wherein when the characteristic is detected, the power delivered by the inverter is varied by a value between 5% and 20%.

5. The method of claim 1, wherein the power delivered by the power source is varied for a pre-set time interval.

6. The method of claim 1, wherein the characteristic indicative of an islanding condition is determined via an impedance measurement.

7. A method for controlling a power supply system connected to a power grid, the power supply system including an electrical power source, an inverter connecting the electrical power source to the power grid, and a load connected to the inverter, the method comprising:
   delivering power to the load;
   detecting a characteristic indicative of an islanding condition of the system;
   when the characteristic is detected, imposing a temporary variation in the power level delivered by the inverter;
   detecting a characteristic indicative of an islanding condition of the system while there is a temporary variation in the power level delivered by the inverter; and
   interrupting the delivery of power to the load in response to detecting a characteristic indicative of an islanding condition of the system while there is a temporary variation in the power level delivered by the inverter.

8. The method of claim 7, wherein when the characteristic is detected, the power delivered by the inverter is temporarily reduced.

9. The method of claim 8, wherein the power delivered by the inverter is temporarily reduced for a pre-set time interval and, if after the pre-set time interval the characteristic is not detected, the power level delivered by the inverter is restored to the level prior to the variation.

10. The method of claim 9, wherein the power level is varied by modifying the current delivered by the inverter.

11. The method of claim 7, wherein the characteristic indicative of an islanding condition is determined via an impedance measurement.

12. A method for controlling a power supply system connected to a grid, the power supply system including an electrical power source, an inverter connecting the electrical power source to the grid and a load connected to the inverter, comprising the following phases:
 delivering power to the load;
 determining a symptomatic condition of islanding of the system;
 when a symptomatic condition of an islanding situation is determined, imposing a variation in the power level delivered by the inverter;
 if the variation in power level delivered by the inverter causes a variation beyond a pre-set limit of an electrical parameter of the system, causing interruption of the power delivery via the inverter.

13. The method of claim 12, wherein when the symptomatic condition is detected, the power delivered by the inverter is temporarily reduced.

14. The method of claim 12, wherein the power level is brought to a varied power level for a pre-set interval of time and wherein, if after the pre-set interval of time the power supply via the inverter has not been de-activated, the power is restored to the level prior to the variation.

15. The method of claim 12, wherein the symptomatic condition of islanding of the system comprises an electrical parameter and wherein the electrical parameter comprises at least one of an output voltage of the inverter; a power supply voltage of the load an output signal frequency of the inverter; and a power supply frequency of the load.

16. An electrical power supply system connected to a local load and to an electrical grid comprising:
 at least one source of electrical power;
 an inverter which receives power from the electrical source and delivers power to the local load;
 a connection to the electrical grid;
 a control unit functionally connected to the inverter, the control unit comprising interrupt logic functional to interrupt the delivery of power;
 the control unit further comprising anti-islanding logic functional to detect at least one symptom of an islanding condition of the system and, when the symptom is detected, to cause a variation in the power delivered by the inverter; and
 wherein the anti-islanding logic is further functional to cause the interrupt logic to interrupt the delivery of power when at least one symptom of an islanding condition of the system is detected when the power delivered by the inverter is varied.

17. The system of claim 16, wherein the anti-islanding logic varies the power delivered by the inverter by reducing the power level delivered by the inverter.

18. The system of claim 17 wherein the anti-islanding logic varies the power delivered by the inverter by reducing the current delivered by the inverter.

19. The system of claim 16, wherein the anti-islanding logic causes a temporary variation in the power delivered by the inverter and after a pre-set interval of time, restores the power delivered to the initial value if power from the inverter has not been interrupted by the interrupt logic.

20. The system of claim 16, wherein the anti-islanding logic causes the interrupt logic to interrupt the power delivery by the inverter if the variation if the power delivered caused by the anti-islanding device causes at least one electrical parameter of the system to exceed a pre-set threshold value.

21. The system of claim 20 wherein the system electrical parameter includes at least one of an output voltage of the inverter, a power supply voltage of the load, an output signal frequency of the inverter, and a power supply frequency of the load.

* * * * *